(12) United States Patent
Sodagar et al.

(10) Patent No.: US 12,153,180 B2
(45) Date of Patent: Nov. 26, 2024

(54) ISO-FREQUENCY RATIO LOGS

(71) Applicant: Saudi Arabian Oil Company, Dahran (SA)

(72) Inventors: Taher M. Sodagar, Dhahran (SA); Amin Z. Alali, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 220 days.

(21) Appl. No.: 17/655,925

(22) Filed: Mar. 22, 2022

(65) Prior Publication Data

US 2023/0324576 A1   Oct. 12, 2023

(51) Int. Cl.
*G01V 1/50*   (2006.01)

(52) U.S. Cl.
CPC ........ *G01V 1/50* (2013.01); *G01V 2210/1295* (2013.01); *G01V 2210/142* (2013.01); *G01V 2210/65* (2013.01)

(58) Field of Classification Search
CPC ............. G01V 1/50; G01V 2210/1295; G01V 2210/142; G01V 2210/65
USPC .......................................................... 702/14
See application file for complete search history.

(56) References Cited

U.S. PATENT DOCUMENTS

| | | | |
|---|---|---|---|
| 6,982,927 | B2 | 1/2006 | Taner |
| 11,327,191 | B2 | 5/2022 | Sodogar |
| 2008/0021656 | A1 | 1/2008 | Saenger et al. |
| 2011/0295510 | A1 | 12/2011 | Gulati et al. |
| 2017/0260842 | A1 | 9/2017 | Jin et al. |
| 2018/0196156 | A1 | 7/2018 | Assous et al. |
| 2020/0174149 | A1 | 6/2020 | Thiruvenkatanatha et al. |
| 2020/0348432 | A1* | 11/2020 | Sodagar ................. G01V 1/325 |
| 2021/0350052 | A1* | 11/2021 | AlQahtani ............. E21B 43/20 |
| 2022/0113439 | A1* | 4/2022 | Sodagar ................. G01V 1/302 |

FOREIGN PATENT DOCUMENTS

| | | | |
|---|---|---|---|
| CN | 106154323 | 11/2016 | |
| WO | WO-2023183362 A1 * | 9/2023 | ............... G01V 1/50 |

OTHER PUBLICATIONS

Deng et al., "Seismic attributes for characterization of a heavy-oil shaly-sand reservoir in the Muglad Basin of South Sudan", Geosciences Journal, vol. 22, No. 6, p. 1027-1039, Dec. 2018 (Year: 2018).*

(Continued)

*Primary Examiner* — Michael P Nghiem
(74) *Attorney, Agent, or Firm* — Fish & Richardson P.C.

(57) ABSTRACT

Disclosed are methods, systems, and computer-readable medium to perform operations including: spectrally decomposing seismic data associated with a target subsurface area into a plurality of iso-frequency volumes; selecting a low-frequency volume and a high-frequency volume from the plurality of iso-frequency volumes; dividing the low-frequency volume by the high-frequency volume to generate a frequency ratio volume for the target subsurface area; establishing a time-depth relationship in the target subsurface area; extracting, based on the time-depth relationship and the frequency ratio volume, an iso-frequency ratio log in the target subsurface area; and using the iso-frequency ratio log to identify a subsurface gas reservoir in the target subsurface area.

14 Claims, 5 Drawing Sheets

(56) References Cited

OTHER PUBLICATIONS

Seg Wiki, "Basic data processing sequence", https://wiki.seg.org/w/index.php?title=Basic_data_processing_sequence&oldid=18981, last edited on Sep. 17, 2014, at 19:10. (Year: 2014).*
Schlumberger, "Recommended Seismic Volume Attributes", Petrel 2015, https://www.slb.com/-/media/files/software-integrated-solutions/product-sheet/petrel-recommended-seismic-volume-attributes-2015-ps.ashx, (Year: 2015).*
Chen et al., "Spectral-decomposition response to reservoir fluids from a deepwater West Africa reservoir," Geophysics, Nov.-Dec. 2008, 73(6):C23-C30, 8 pages.
Sodagar, "Revelation of the Triassic Gas Potential with Insight of Iso Frequency Spectral Decomposition in Saudi Arabia's Offshore," presented at the SPE Middle East Oil & Gas Show and Conference, Manama, Bahrain, Mar. 2015, 16 pages.
Wang, "Seismic time-frequency spectral decomposition by matching pursuit," Geophysics, Jan.-Feb. 2007, 72(1):V13-V20, 8 pages.
Alwusaibie, "Revealing the stratigraphic potential of a clastic reservoir using reservoir-to-shadow monofrequency (RSMF) and amplitude analysis in Saudi Arabia," SEG Technical Program Expanded Abstracts, Aug. 2017, 5 pages.
Castagna et al., "Instantaneous spectral analysis: detection of low frequency shadows associated with hydrocarbons," The Leading Edge, vol. 22, Feb. 2003, 6 pages.
Chakraborty and Okaya, "Frequency-time decomposition of seismic data using wavelet based methods," Geophysics vol. 60, No. 6, November-Dec. 1995, 11 pages.
Chopra and Marfurt, "Seismic attributes for prospect identification and reservoir characterization," SEG geophysical developments series, No. 11, 2007, p. 123-150, 20 pages.
Dai et al., "The Application of Frequency Hydrocarbon Detection Technique in a Lithological Reservoir of the Junggar Basin," 75 EAGE Conference & Exhibition incorporating Spe Europec, 2013, 5 pages.
Deng et al., "Seismic attributes for characterization of a heavy-oil shaly-sand reservoir in the Muglad Basin of South Sudan," Geosciences Journal, The Geological Society of Korea, Apr. 2018, 6, pages.
Partyka et al., "Interpretational application of spectral decompsotion in reservoir characterization," The Leading Edge, vol. 18, Mar. 1999, 5 pages.
Sodagar et al., "Iso frequency spectral decomposition ratio technology workflow for gas carbonate field developments and characterization," First EAGE Reservoir Characterization and Modeling Workflows for Giant Carbonate Field, Feb. 2019, 4 pages.
Zhang et al., "Fluid detection by spectral decomposition: lessons from numerical, physical modelling and field studies," Expanded Abstracts, 69th EAGE Meeting, London, Jun. 2007, 5 pages.

* cited by examiner

ISO-FREQUENCY RATIO LOGS

TECHNICAL FIELD

This disclosure relates to methods and systems for generating iso-frequency ratio logs.

BACKGROUND

Many of the current seismic methods of gas detection rely on an analysis of reflection amplitude of seismic data. Reflection amplitude, however, is affected by many variables including lithology, porosity, and fluid content of geological formations. Given the number of variables that affect reflection amplitude, accurately deriving one of those variables is difficult and unreliable, particularly fluid or gas content, from the reflection amplitude.

SUMMARY

The present disclosure describes methods and systems, including computer-implemented methods, computer program products, and computer systems for identifying locations of gas zones in subsurface reservoirs. Aspects of the subject matter described in this specification may be embodied in methods that include: spectrally decomposing seismic data associated with a target subsurface area into a plurality of iso-frequency volumes; selecting a low-frequency volume and a high-frequency volume from the plurality of iso-frequency volumes; dividing the low-frequency volume by the high-frequency volume to generate a frequency ratio volume for the target subsurface area; establishing a time-depth relationship in the target subsurface area; extracting, based on the time-depth relationship and the frequency ratio volume, an iso-frequency ratio log in the target subsurface area; and using the iso-frequency ratio log to identify a subsurface gas reservoir in the target subsurface area.

The previously described implementation is implementable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, where establishing a time-depth relationship in the target subsurface area includes: receiving one or more well logs measured in one or more drilled wells in proximity of the target subsurface area; and establishing, based on the one or more well logs, the time-depth relationship in the target subsurface area.

In some implementations, where the one or more well logs include at least one of: a sonic log, a vertical seismic profile, or a check-shots log.

In some implementations, where extracting, based on the time-depth relationship and the frequency ratio volume, an iso-frequency ratio log in the target subsurface area includes: using the time-depth relationship to associate depth information of the target subsurface area with the frequency ratio volume; and extracting, from the frequency ratio volume, the iso-frequency ratio log along the target subsurface area.

In some implementations, where the seismic data is a Relative Amplitude Preserved (RAP) processed three-dimensional (3D) Pre-Stack Time Migration (PSTM) seismic data volume.

In some implementations, where using the iso-frequency ratio log to identify a subsurface gas reservoir in the target subsurface area includes: identifying a high amplitude frequency ratio in the iso-frequency ratio log; and designating an area associated with the high amplitude frequency ratio as the subsurface gas reservoir.

In some implementations, where designating an area associated with the high amplitude frequency ratio as the subsurface gas reservoir includes: determining whether the high amplitude frequency ratio is greater than a threshold frequency ratio; and in response to determining that the high amplitude frequency ratio is greater than the threshold frequency ratio, determining that the high amplitude frequency ratio is indicative of a gas bearing region.

In some implementations, the method 300 further including: displaying the iso-frequency ratio log on a graphical user interface (GUI) of a display device. This graphical representation of the log can be used to visually indicate locations that contain gas. In some implementations, the displayed view can be used to locate potential areas for drilling or to identify lateral extent of a reservoir. As another example, the method 300 may additionally involve drilling in one or more locations where gas is present. This step may involve providing information indicative of the one or more locations to a controller (for example, a computing device) of the drilling operations. Based on the information provided, the controller may control drilling equipment to drill in the one or more locations.

Particular implementations of the subject matter described in this specification can be implemented in order to improve seismic methods of gas reservoir detection. The disclosed methods and systems generate logs that aid in the process of reservoir interpretation without the need of additional logging tools or extra costs. As an example, the disclosed methods and systems generate a virtual iso-frequency ratio log along a desired well path in an input seismic volume. The virtual iso-frequency ratio log is generated using diverse robust and accurate data sources, such as sonic logs, check-shots, and vertical seismic profiles. Thus, unlike existing solutions, the disclosed methods and systems generate logs without the use of imprecise velocity volumes. Doing so enables generation of more accurate logs and more efficiently (e.g., in less time and using less processing power) than is achievable using existing solutions. Further, the disclosed methods and systems are effective by yielding correlations with already drilled well results without the need for logging tools.

Additionally, the logs generated by the disclosed methods and systems can be used for identification of gas fluid types and/or gas zones. The improved methods generate a more accurate representation of the location of gas reservoirs than representations currently achieved in practice. Furthermore, the improved methods facilitate accurate drilling operations for extracting gas from an area of interest. Further, the improved methods enhance vertical and horizontal well placements for better gas reservoir characterization. Yet further, the improved methods reduce the risk of drilling high-saturated water wells and capitalize on drilling producing gas reservoir wells, thereby improving cost, effort, and time efficiencies.

The details of one or more embodiments of these systems and methods are set forth in the accompanying drawings and the description below. Other features, objects, and advantages of these systems and methods will be apparent from the description and drawings, and from the claims.

BRIEF DESCRIPTION OF THE DRAWINGS

Like reference numbers and designations in the various drawings indicate like elements.

DETAILED DESCRIPTION

The following detailed description describes systems and methods to improve seismic methods of gas detection, and is presented to enable a person skilled in the art to make and use the disclosed subject matter in the context of one or more particular implementations. Various modifications, alterations, and permutations of the disclosed implementations can be made and will be readily apparent to those skilled in the art, and the general principles defined may be applied to other implementations and applications without departing from the scope of the disclosure. Thus, the present disclosure is not intended to be limited to the described or illustrated implementations, but is to be accorded the widest scope consistent with the principles and features disclosed.

Scattering theory indicates that a geological formation containing gas causes energy attenuation in seismic waves passing through the formation, particularly in the high-frequency components of the waves. As a result of the high attenuation of high-frequencies in the geological formation, areas below the gas-containing geological formations reflect anomalously low frequencies. These low frequencies are referred to as seismic shadows and the regions where seismic shadows occur are referred to as shadow zones. Because of their distinctive properties, seismic shadows have traditionally been used as direct hydrocarbon indicators. For instance, seismic shadows have been detected by identifying spectral differences in the seismic data collected from above and below the shadow zone.

However, in some cases, because of variations of the gas reservoir thickness, the gas does not cause energy attenuation in the seismic waves passing through the gas reservoir. In such cases, seismic shadows are not a reliable indicator of the presence of gas. Other shortcomings of relying on seismic shadows are that loose sands and porous sandstone have similar frequency responses to seismic shadows. Furthermore, there are other types of formations, such as gas clouds and gas chimneys that also have seismic shadows.

More recently, spectral decomposition has been used to decompose a seismic volume into a range of frequencies. This process enables obtaining defined frequency volumes. The response of spectral decomposition is affected by many factors, including effective attenuation, fluid type, thickness, and stratigraphy of the zone of interest. Out of these factors, the fluid type is one of the more influential factors affecting the frequency response. For example, the presence of gas within a reservoir can affect different ranges of frequency differently. More specifically, the response of gas presences inversely affects high and low frequency volumes. At a zone of interest containing gas in a reservoir, a high frequency volume shows a low amplitude, whereas in the same zone location, a low frequency volume shows a high amplitude. Further, high and low frequencies are affected differently by the presence of gas in terms of attenuation. The presence of gas does not cause a boost in amplitude for low frequency. However, the presence of gas attenuates the amplitude in the high frequency volumes. Given the potential for using frequency response to detect gas zones, it is desirable to develop solutions for detecting gas zones based on the frequency response.

This disclosure describes methods and systems for identifying locations of gas zones in subsurface reservoirs. In an embodiment, the methods and systems generate a virtual iso-frequency ratio log that is used for hydrocarbon detection and field reservoir characterization. As described in more detail below, the virtual iso-frequency ratio log is generated using diverse robust and accurate data sources, such as sonic logs, check-shots, and vertical seismic profiles. As also described in more detail below, the virtual iso-frequency ratio log yields correlations with existing drilled well results without the need for logging tools.

Figure 1:
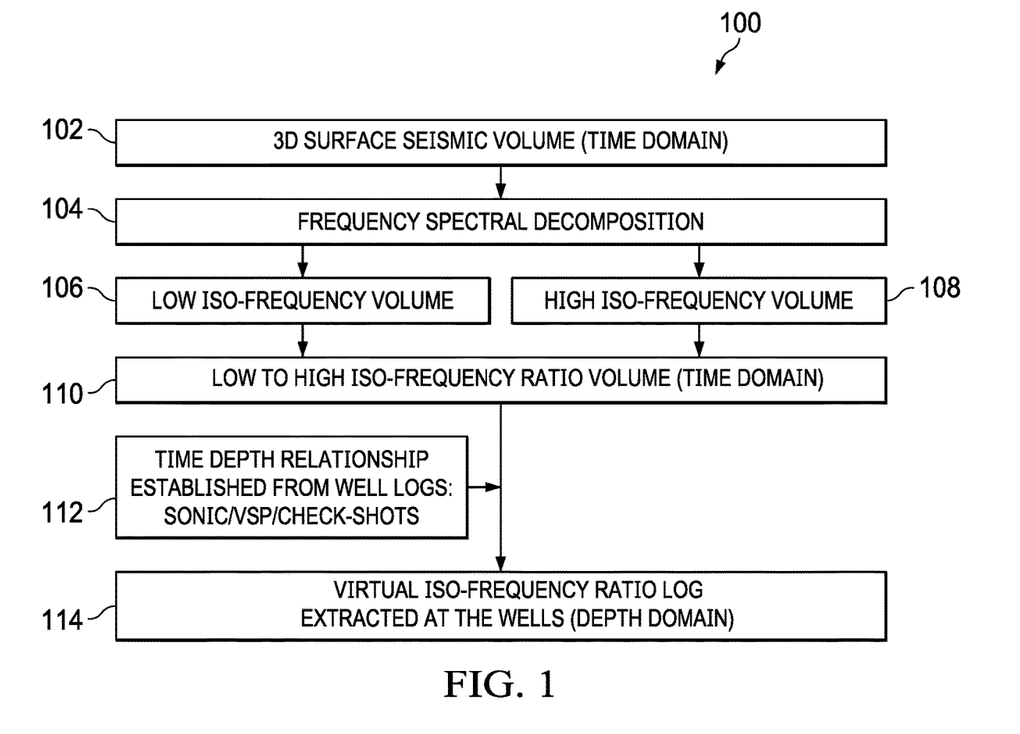
FIG. 1 illustrates a simplified block diagram of an example workflow for direct gas reservoir detection, according to some implementations of the present disclosure.
Figure 5:
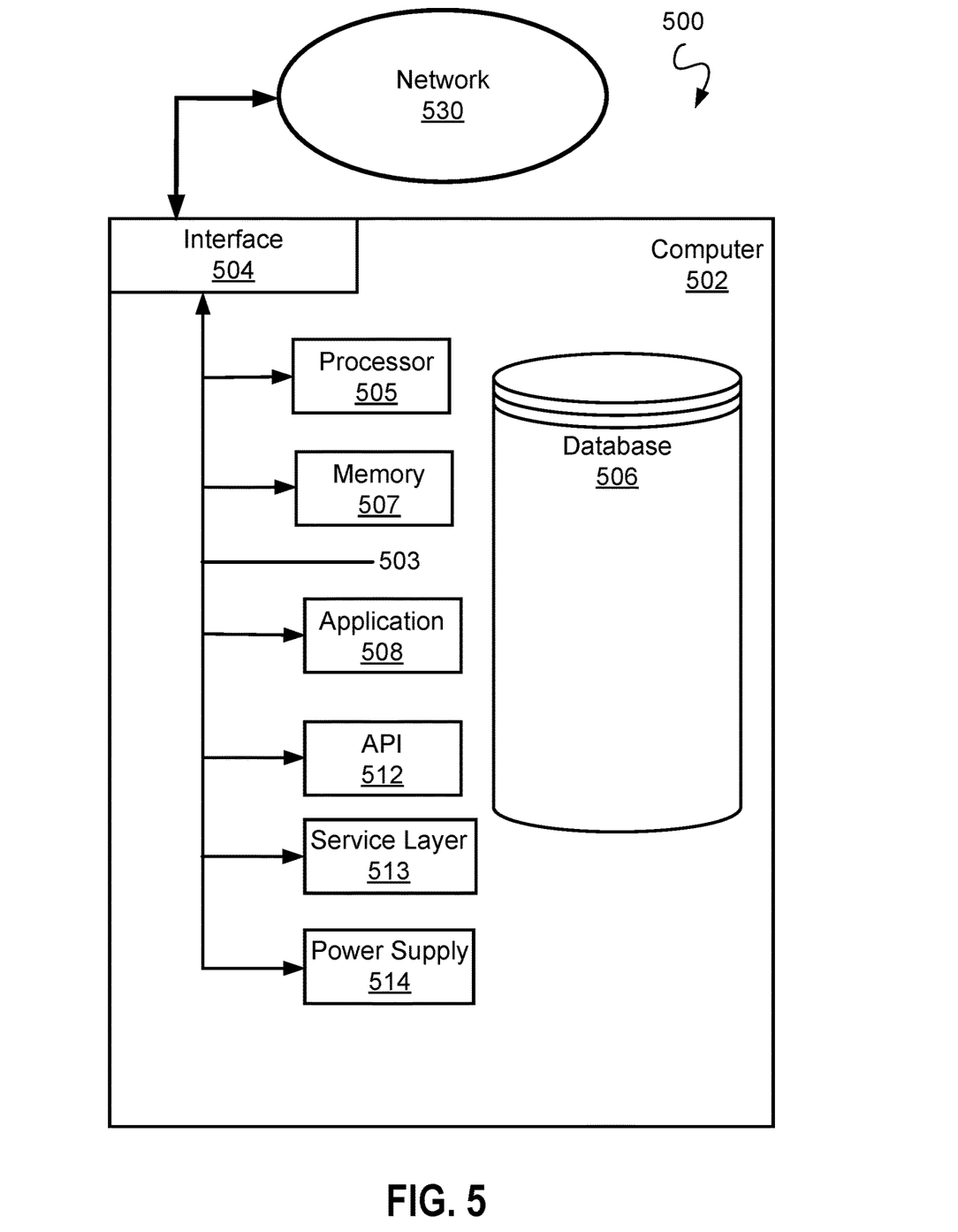
FIG. 5 illustrates a block diagram of an example computer system used to provide computational functionalities associated with described algorithms, methods, functions, processes, flows, and procedures, according to some implementations of the present disclosure.

FIG. 1 is a simplified block diagram of an example workflow 100 for direct gas reservoir detection, according to some implementations. The example workflow 100 generates a virtual iso-frequency ratio log that can be used for hydrocarbon (e.g., gas) detection and field reservoir characterization in an area of interest in a reservoir. As described in more detail below, the workflow 100 generates the virtual iso-frequency ratio log using precise logs gathered from drilled wells in the reservoir. In an example, the workflow 100 can be performed using a computer system. FIG. 5 illustrates an example computer system.

Figure 4:
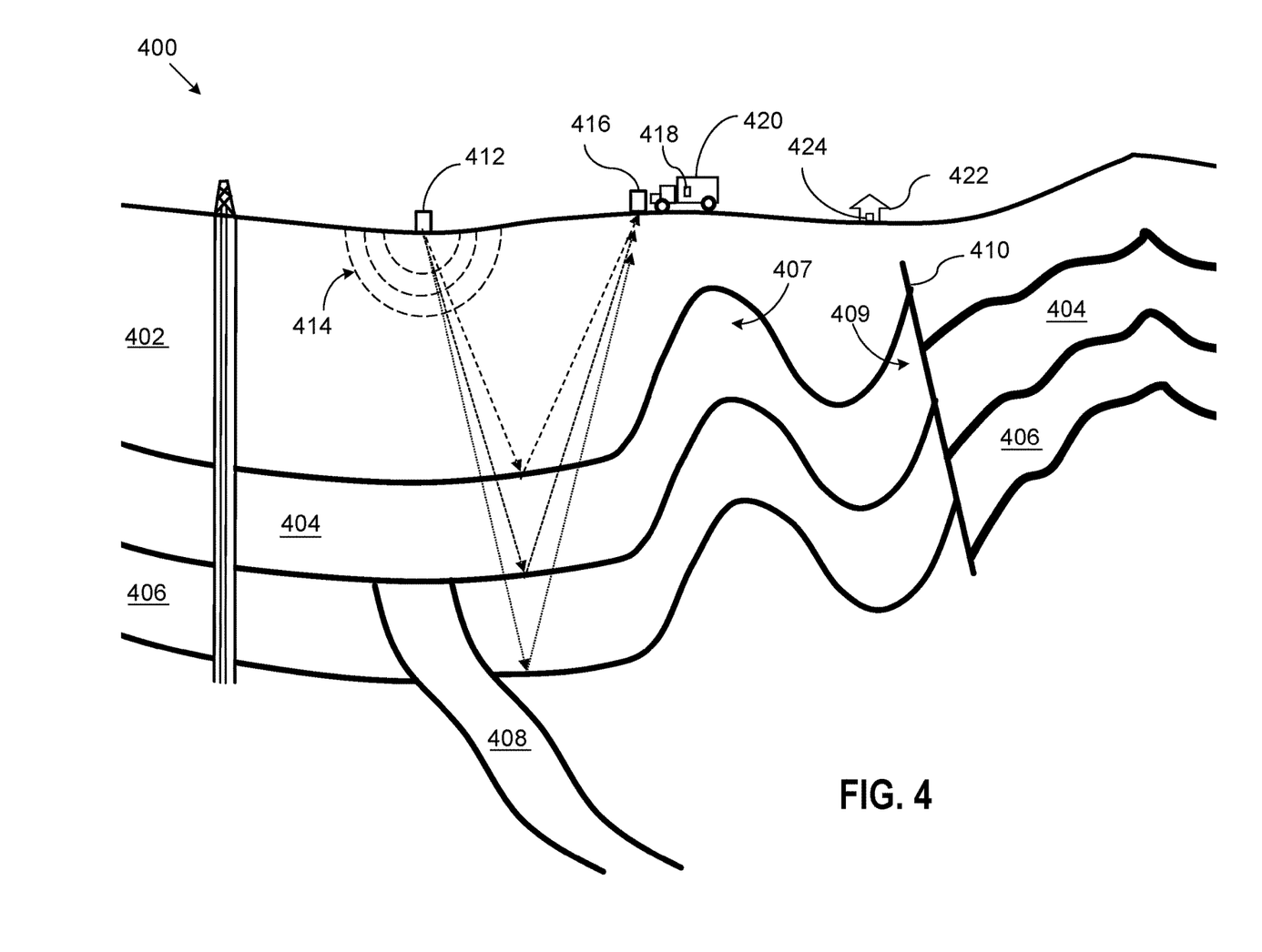
FIG. 4 illustrates an example seismic survey, according to some implementations of the present disclosure.

The workflow 100 starts at step 102 of receiving a three-dimensional (3D) seismic data volume. In an example, the 3D seismic data volume is received from a computing device different from a computing device executing the workflow 100. In another example, the 3D seismic data volume is generated by the same computing device or system that is executing the workflow 100. FIG. 4 illustrates an example seismic survey that generates seismic data.

In an example, the 3D seismic data volume is a Relative Amplitude Preserved (RAP) processed 3D Pre-Stack Time Migration (PSTM) seismic data volume with noise attenuation and multiple removal. The main objectives of RAP seismic processing are to (i) broaden the frequency spectrum, (ii) preserve low frequencies and relative amplitudes, and (iii) attenuate outstanding multiple dominants at targeted reservoir levels. These objectives serve to provide ideal seismic data for qualitative and quantitative stratigraphic interpretation, which include representing true Earth reflectivity, maintaining sufficient correlation with well data, and preserving full frequency bandwidth. The stratigraphic seismic processing procedure employed involves high frequency aliased noise extraction, low frequency random noise removal, surface-related multiples attenuation, surface-consistent deconvolution, velocity analysis, PSTM, de-multiple sequence, and post-stack enhancement processing.

At step 104, the workflow 100 involves generating a plurality of iso-frequency spectral decomposition volumes. In general, each individual seismic trace in the 3D seismic data volume includes a wide-range of composed frequencies. In an implementation, the plurality of iso-frequency volumes may be generated by decomposing, splitting, or separating the 3D seismic data volume into several fundamental frequency band wavelets and sorting the wavelets into seismic frequency gathers. In an example, iso-frequency volumes from 10 to 40 Hz are constructed inclusively using increments of 10 Hz. Other frequency ranges are also possible. The selected frequency range may depend on the amplitude variations with wide or narrow range of frequencies at the subsurface reservoir in the target locations. For instance, if the targeted reservoirs are shallower in depth, then the frequency range 30-60 Hz is practical because shallow reservoirs contain higher frequencies than deeper reservoirs.

At step 106, the workflow 100 involves selecting a low iso-frequency volume from one of the iso-frequency spectral decomposition volumes. For instance, the low iso-frequency volume that is selected is one where amplitudes of the frequencies in gas reservoir locations is much higher than amplitudes of the frequencies in wet reservoir (for example, water well) locations. Additionally, the low iso-frequency volume that is selected is one where amplitudes of the frequencies in shadow zones below gas reservoirs attenuate more significantly than amplitudes of the frequencies in shadow zones below wet reservoirs. In an example, the selected low iso-frequency volume is a 10 Hz volume. Other frequencies are also possible. The selected frequency may depend on the amplitude variations of frequencies at the subsurface reservoir in the target locations.

At step 108, the workflow 100 involves selecting a high iso-frequency volume from one of the iso-frequency spectral decomposition volumes. For instance, the high iso-frequency volume that is selected is one where amplitudes of the frequencies in gas reservoir locations is very low. Additionally, the high iso-frequency volume that is selected is one where amplitudes of the frequencies in shadow zones below gas reservoirs are greater than amplitudes of the frequencies in shadow zones below gas reservoirs at the low iso-frequency volume. In an example, the selected high iso-frequency volume is a 40 Hz volume. Other frequencies are also possible. The selected frequency may depend on the amplitude variations of frequencies at the subsurface reservoir in the target locations.

At step 110, the workflow 100 involves generating a ratio volume. In an example, the ratio volume is generated by dividing the low iso-frequency volume by the high iso-frequency volume.

At step 112, the workflow 100 involves establishing a time-depth relationship for the reservoir at the wells of interest. In an example, establishing the time-depth relationship utilizes one or more precise logs (e.g., seismic and depth logs) from previously drilled wells in the subsurface reservoir. The precise logs can include sonic logs, check-shots, and vertical seismic profiles (VSPs). More specifically, the data from the existing wells is used to establish the relationship between the depth of the wells (i.e., depth-domain data) and the seismic data (i.e., time-domain data). In an example, seismic velocities are scaled based on check shots and/or well logs such that geological locations and seismic horizons match in depth.

At step 114, the workflow 100 involves using the iso-frequency ratio seismic attribute volume and the time-depth relationship to generate a virtual iso-frequency ratio log. In an example, the time-depth relationship is used to tie a desired well or desired target area (which is in depth domain) to the frequency ratio volume (which is in time domain). Then, the frequency ratio log is extracted along a well path of the desired well. The resulting log is the virtual iso-frequency ratio log. More specifically, the time-depth information is used to identify a portion of the frequency ratio volume that is associated with the desired well. That portion of the frequency ratio volume is then extracted as the virtual iso-frequency ratio log.

In some embodiments, the virtual iso-frequency ratio log is used for hydrocarbon detection and field reservoir characterization. In an example, a graphical representation (e.g., a curve) of the virtual iso-frequency ratio log can be displayed on a graphical user interface (GUI) of a user device with other calculated logs during and after drilling. The value of the virtual iso-frequency ratio log can be used for gas detection. In one example, values in the iso-frequency ratio log at the reservoir of interest that are greater than a threshold value indicate the presence of gas detection. The threshold value can be determined based on historical values associated with producing wells or can be manually set by a user.

Figure 2:
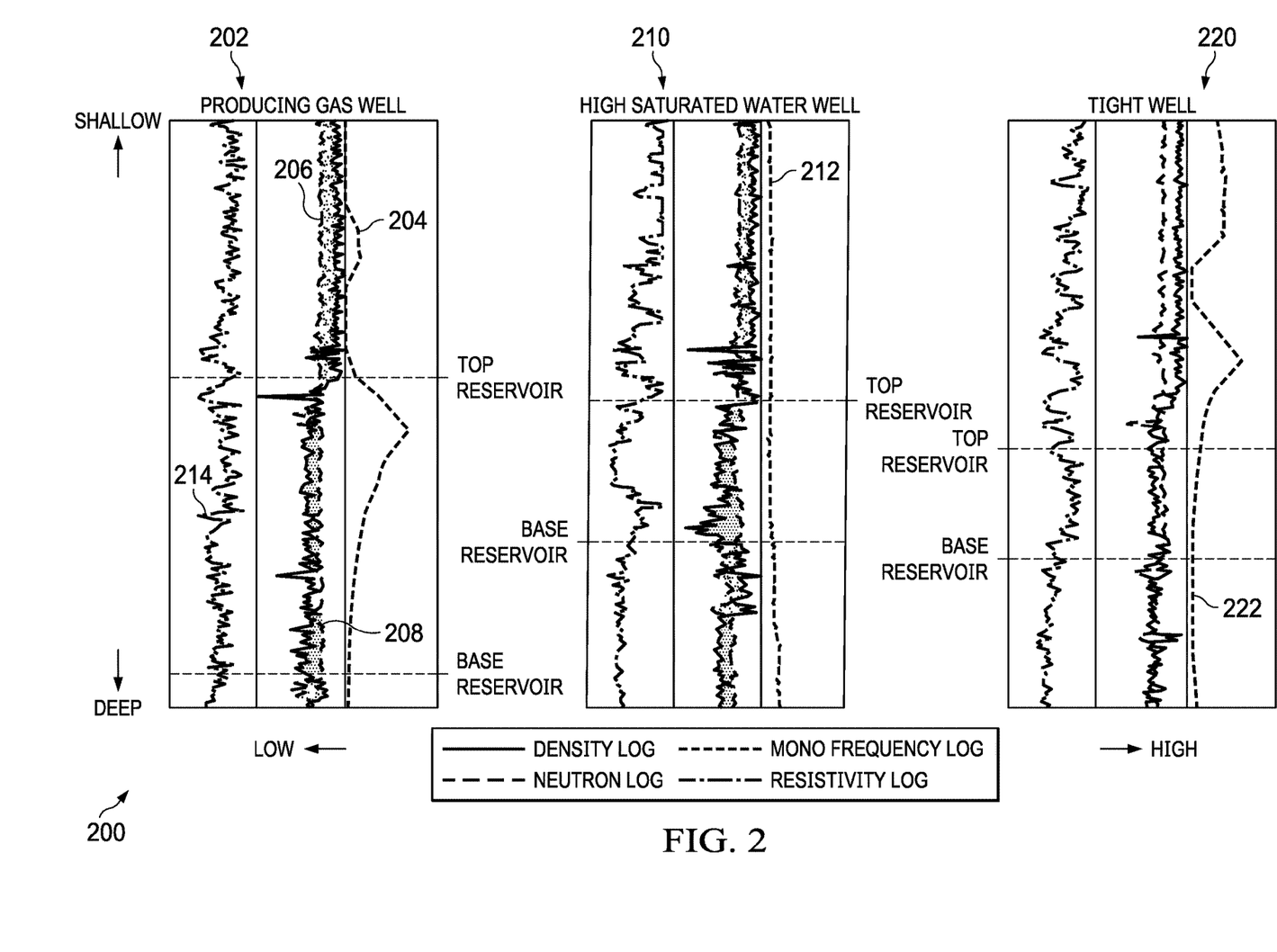
FIG. 2 illustrates example logs generated for three wells, according to some implementations of the present disclosure.

FIG. 2 illustrates example logs 200 generated for three wells, according to some implementations. The three wells are a highly saturated water well, a tight gas well, and a producing well. In an example, one or more of the logs of FIG. 2 are generated using the workflow 100 of FIG. 1. These logs are used to validate the results of the workflow 100. As described below, the producing gas well indicated high values (e.g., greater than a threshold) in the iso-frequency ratio log at the reservoir of interest. On the other hand, both the highly saturated water well and the tight gas well showed low values (e.g., less than a threshold) of in the iso-frequency ratio log at the reservoir zone. The results of the workflow 100 showed significant correlation between the actual well results and the generated iso-frequency ratio log.

Turning first to logs 202 of the producing well, it is shown that as the well enters the reservoir zone, a virtual iso-frequency ratio log 204 increases in value or amplitude. This increase can be interpreted as a result of the presence of gas fluid type within the reservoir. As also shown in FIG. 2, values of a resistivity log 214 also increased in value in the reservoir zone. This further validates the connection between the virtual iso-frequency ratio log 204 and the presence of gas in the reservoir. Yet another indication of the presence of gas in the reservoir is a separation between a neutron log 206 and a density log 208.

In contrast, moving to logs 210 of the highly saturated water well, it is clear that values of a virtual iso-frequency ratio log 212 has not changed as it enters the reservoir zone. This finding is further supported by a drop in resistivity at the top of the reservoir. At the bottom of the reservoir zone, the resistivity values increase alongside the separation between the neutron and density log. Rhis can be indicative of some gas saturation presence as it is also noted that there is a small increase in the values from the virtual iso-frequency ratio log 212 at the bottom of the reservoir.

Turning to logs 220 of the tight gas well. Although the resistivity appears to be high in value, values of a virtual iso-frequency ratio log 222 are low at the reservoir zone. This validates that iso-frequency ratio logs can be used to identify tight gas wells.

These examples show that there is a significant correlation between actual well results and iso-frequency ratio logs. Thus, the workflow 100 of FIG. 1 is capable of detecting fluids at wells of interest. In some embodiments, the iso-frequency ratio logs can be used to evaluate stratigraphic zones of interest within a reservoir containing gas. Evaluating the stratigraphic zones of interest enhances the well placement of vertical and horizontal wells for better gas reservoir characterization with more robust and accurate established time-depth relationship at drilled wells. This reduces the risk of drilling highly saturated water wells and capitalizes on drilling the producing gas reservoir wells to optimize the cost, effort, and time spent.

Figure 3:
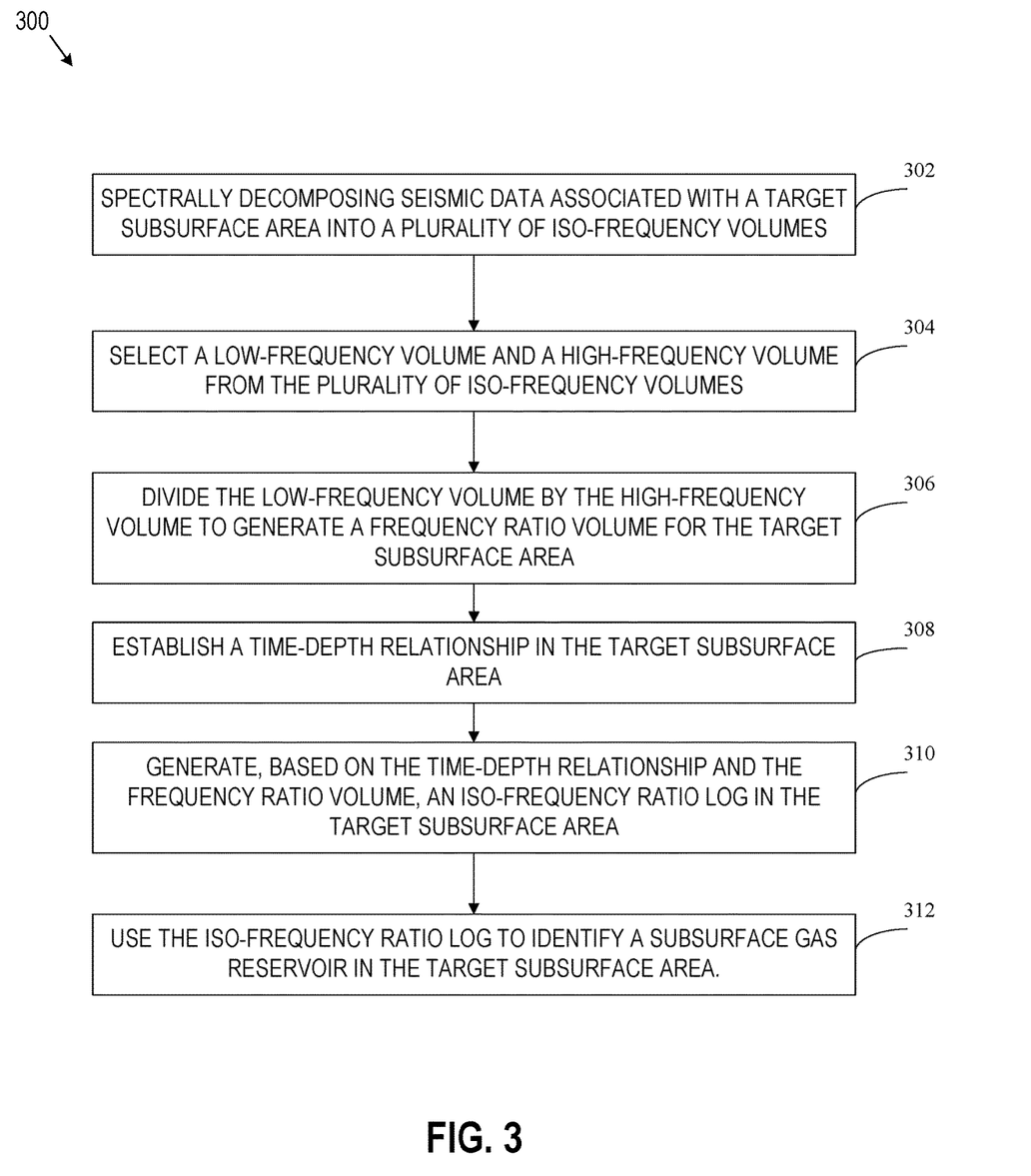
FIG. 3 illustrates a flowchart of an example method, according to some implementations of the present disclosure.

FIG. 3 is a flow chart of an example method 300, according to some implementations. For clarity of presentation, the description that follows generally describes method 300 in the context of the other figures in this description. For example, method 300 can be performed by a computer system described in FIG. 5. However, it will be understood that method 300 may be performed, for example, by any suitable system, environment, software, and hardware, or a combination of systems, environments, software, and hardware, as appropriate. In some implementations, various steps of method 300 can be run in parallel, in combination, in loops, or in any order.

The method 300 starts at step 302, which involves spectrally decomposing seismic data associated with a target subsurface area into a plurality of iso-frequency volumes.

At step 304, method 300 involves selecting a low-frequency volume and a high-frequency volume from the plurality of iso-frequency volumes.

At step 306, method 300 involves dividing the low-frequency volume by the high-frequency volume to generate a frequency ratio volume for the target subsurface area.

At step 308, method 300 involves establishing a time-depth relationship in the target subsurface area.

At step 310, method 300 involves extracting, based on the time-depth relationship and the frequency ratio volume, an iso-frequency ratio log in the target subsurface area.

At step 312, method 300 involves using the iso-frequency ratio log to identify a subsurface gas reservoir in the target subsurface area.

The example method 300 shown in FIG. 3 can be modified or reconfigured to include additional, fewer, or different steps (not shown in FIG. 3), which can be performed in the order shown or in a different order.

In some implementations, where establishing a time-depth relationship in the target subsurface area includes: receiving one or more well logs measured in one or more drilled wells in proximity of the target subsurface area; and establishing, based on the one or more well logs, the time-depth relationship in the target subsurface area.

In some implementations, where the one or more well logs include at least one of: a sonic log, a vertical seismic profile, or a check-shots log.

In some implementations, where extracting, based on the time-depth relationship and the frequency ratio volume, an iso-frequency ratio log in the target subsurface area includes: using the time-depth relationship to associate depth information of the target subsurface area with the frequency ratio volume; and extracting, from the frequency ratio volume, the iso-frequency ratio log along the target subsurface area.

In some implementations, where the seismic data is a Relative Amplitude Preserved (RAP) processed three-dimensional (3D) Pre-Stack Time Migration (PSTM) seismic data volume.

In some implementations, where using the iso-frequency ratio log to identify a subsurface gas reservoir in the target subsurface area includes: identifying a high amplitude frequency ratio in the iso-frequency ratio log; and designating an area associated with the high amplitude frequency ratio as the subsurface gas reservoir.

In some implementations, where designating an area associated with the high amplitude frequency ratio as the subsurface gas reservoir includes: determining whether the high amplitude frequency ratio is greater than a threshold frequency ratio; and in response to determining that the high amplitude frequency ratio is greater than the threshold frequency ratio, determining that the high amplitude frequency ratio is indicative of a gas bearing region.

In some implementations, the method 300 further including: displaying the iso-frequency ratio log on a graphical user interface (GUI) of a display device. This graphical representation of the log can be used to visually indicate locations that contain gas. In some implementations, the displayed view can be used to locate potential areas for drilling or to identify lateral extent of a reservoir. As another example, the method 300 may additionally involve drilling in one or more locations where gas is present. This step may involve providing information indicative of the one or more locations to a controller (for example, a computing device) of the drilling operations. Based on the information provided, the controller may control drilling equipment to drill in the one or more locations.

In some implementations, one or more of the steps shown in FIG. 3 can be repeated or reiterated, for example, until a terminating condition is reached. In some implementations, one or more of the individual steps shown in FIG. 3 can be executed as multiple separate steps, or one or more subsets of the steps shown in FIG. 3 can be combined and executed as a single step. In some implementations, one or more of the individual steps shown in FIG. 3 may also be omitted from the example method 300.

FIG. 4 is an example seismic survey, according to some implementations of the present disclosure. In an implementation, the seismic survey is being performed to map subterranean features such as facies and faults in a subterranean formation 400. The seismic data generated by the seismic survey can be used as an input to the disclosed seismic iso-frequency workflow. The subterranean formation 400 includes a layer of impermeable cap rocks 402 at the surface. Facies underlying the impermeable cap rocks 402 include a sandstone layer 404, a limestone layer 406, and a sand layer 408. A fault line 410 extends across the sandstone layer 404 and the limestone layer 406.

A seismic source 412 (for example, a seismic vibrator or an explosion) generates seismic waves 414 that propagate in the earth. The velocity of these seismic waves depends on properties such as, for example, density, porosity, and fluid content of the medium through which the seismic waves are traveling. Different geologic bodies or layers in the earth are distinguishable because the layers have different properties and, thus, different characteristic seismic velocities. For example, in the subterranean formation 400, the velocity of seismic waves traveling through the subterranean formation 400 will be different in the sandstone layer 404, the limestone layer 406, and the sand layer 408. As the seismic waves 414 contact interfaces between geologic bodies or layers that have different velocities, the interface reflects some of the energy of the seismic wave and refracts part of the energy of the seismic wave. Such interfaces are sometimes referred to as horizons.

The seismic waves 414 are received by a sensor or sensors 416. Although illustrated as a single component in FIG. 4, the sensor or sensors 416 are typically a line or an array of sensors 416 that generate an output signal in response to received seismic waves including waves reflected by the horizons in the subterranean formation 400. The sensors 416 can be geophone-receivers that produce electrical output signals transmitted as input data, for example, to a computer 418 on a seismic control truck 420. Based on the input data, the computer 418 may generate a seismic data output such as, for example, a seismic two-way response time plot.

A control center 422 can be operatively coupled to the seismic control truck 420 and other data acquisition and wellsite systems. The control center 422 may have computer facilities for receiving, storing, processing, and/or analyzing data from the seismic control truck 420 and other data acquisition and wellsite systems. For example, computer systems 424 in the control center 422 can be configured to analyze, model, control, optimize, or perform management tasks of field operations associated with development and production of resources such as oil and gas from the subterranean formation 400. Alternatively, the computer systems 424 can be located in a different location than the control center 422. Some computer systems are provided with functionality for manipulating and analyzing the data, such as performing seismic interpretation or borehole resistivity image log interpretation to identify geological surfaces in the subterranean formation or performing simulation, planning, and optimization of production operations of the wellsite systems.

In some embodiments, results generated by the computer system 424 may be displayed for user viewing using local or remote monitors or other display units. One approach to analyzing seismic data is to associate the data with portions of a seismic cube representing represent the subterranean formation 400. The seismic cube can also display results of the analysis of the seismic data associated with the seismic survey.

FIG. 5 is a block diagram of an example computer system 500 used to provide computational functionalities associated with described algorithms, methods, functions, processes, flows, and procedures, according to some implementations of the present disclosure. The illustrated computer 502 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI).

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus 503. In some implementations, any or all of the components of the computer 502, including hardware or software components, can interface with each other or the interface 504 (or a combination of both), over the system bus 503. Interfaces can use an application programming interface (API) 512, a service layer 513, or a combination of the API 512 and service layer 513. The API 512 can include specifications for routines, data structures, and object classes. The API 512 can be either computer-language independent or dependent. The API 512 can refer to a complete interface, a single function, or a set of APIs.

The service layer 513 can provide software services to the computer 502 and other components (whether illustrated or not) that are communicably coupled to the computer 502. The functionality of the computer 502 can be accessible for all service consumers using this service layer. Software services, such as those provided by the service layer 513, can provide reusable, defined functionalities through a defined interface. For example, the interface can be software written in JAVA, C++, or a language providing data in extensible markup language (XML) format. While illustrated as an integrated component of the computer 502, in alternative implementations, the API 512 or the service layer 513 can be stand-alone components in relation to other components of the computer 502 and other components communicably coupled to the computer 502. Moreover, any or all parts of the API 512 or the service layer 513 can be implemented as child or sub-modules of another software module, enterprise application, or hardware module without departing from the scope of the present disclosure.

The computer 502 includes an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 also includes a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

The application 508 can be an algorithmic software engine providing functionality according to particular needs, desires, or particular implementations of the computer 502 and the described functionality. For example, application 508 can serve as one or more components, modules, or applications. Further, although illustrated as a single application 508, the application 508 can be implemented as multiple applications 508 on the computer 502. In addition, although illustrated as internal to the computer 502, in alternative implementations, the application 508 can be external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system containing computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer readable media (transitory or non-transitory, as appropriate) suitable for storing computer program instructions and data can include all forms of permanent/non-permanent and volatile/non-volatile memory, media, and memory devices. Computer readable media can include, for example, semiconductor memory devices such as random access memory (RAM), read only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer readable media can also include, for example, magnetic devices such as tapes, cartridges, cassettes, and internal/removable disks. Computer readable media can also include magneto optical disks and optical memory devices and technologies including, for example, digital video disc (DVD), CD ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers to read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

We claim:

1. A method comprising:
spectrally decomposing seismic data associated with a target subsurface area into a plurality of iso-frequency volumes, wherein the seismic data is a Relative Amplitude Preserved (RAP) processed three-dimensional (3D) Pre-Stack Time Migration (PSTM) seismic data volume;
selecting a low-frequency volume and a high-frequency volume from the plurality of iso-frequency volumes;
dividing the low-frequency volume by the high-frequency volume to generate a frequency ratio volume for the target subsurface area, wherein dividing the low-frequency volume by the high-frequency volume comprises dividing values of low-frequency seismic data in the low-frequency volume by values of high-frequency seismic data in the high-frequency volume;
establishing a time-depth relationship in the target subsurface area;
extracting, based on the time-depth relationship and the frequency ratio volume, an iso-frequency ratio log in the target subsurface area, wherein extracting the iso-frequency ratio log comprises:
using the time-depth relationship to associate depth information of the target subsurface area with the frequency ratio volume; and
extracting, from the frequency ratio volume, the iso-frequency ratio log along the target subsurface area; and
using the iso-frequency ratio log to identify a subsurface gas reservoir in the target subsurface area.

2. The method of claim 1, wherein establishing a time-depth relationship in the target subsurface area comprises:
receiving one or more well logs measured in one or more drilled wells in proximity of the target subsurface area; and
establishing, based on the one or more well logs, the time-depth relationship in the target subsurface area.

3. The method of claim 2, wherein the one or more well logs comprise at least one of: a sonic log, a vertical seismic profile, or a check-shots log.

4. The method of claim 1, wherein using the iso-frequency ratio log to identify a subsurface gas reservoir in the target subsurface area comprises:
identifying a high amplitude frequency ratio in the iso-frequency ratio log; and
designating an area associated with the high amplitude frequency ratio as the subsurface gas reservoir.

5. The method of claim 4, wherein designating an area associated with the high amplitude frequency ratio as the subsurface gas reservoir comprises:
determining whether the high amplitude frequency ratio is greater than a threshold frequency ratio; and
in response to determining that the high amplitude frequency ratio is greater than the threshold frequency ratio, determining that the high amplitude frequency ratio is indicative of a gas bearing region.

6. The method of claim 1, further comprising:
displaying the iso-frequency ratio log on a graphical user interface (GUI) of a display device.

7. One or more non-transitory computer-readable storage media coupled to one or more processors and having instructions stored thereon which, when executed by the one or more processors, cause the one or more processors to perform operations comprising:
spectrally decomposing seismic data associated with a target subsurface area into a plurality of iso-frequency volumes, wherein the seismic data is a Relative Amplitude Preserved (RAP) processed three-dimensional (3D) Pre-Stack Time Migration (PSTM) seismic data volume;
selecting a low-frequency volume and a high-frequency volume from the plurality of iso-frequency volumes;
dividing the low-frequency volume by the high-frequency volume to generate a frequency ratio volume for the target subsurface area, wherein dividing the low-frequency volume by the high-frequency volume comprises dividing values of low-frequency seismic data in the low-frequency volume by values of high-frequency seismic data in the in the high-frequency volume;
establishing a time-depth relationship in the target subsurface area;
extracting, based on the time-depth relationship and the frequency ratio volume, an iso-frequency ratio log in the target subsurface area, wherein extracting the iso-frequency ratio log comprises:
  using the time-depth relationship to associate depth information of the target subsurface area with the frequency ratio volume; and
  extracting, from the frequency ratio volume, the iso-frequency ratio log along the target subsurface area; and
using the iso-frequency ratio log to identify a subsurface gas reservoir in the target subsurface area.

8. The one or more non-transitory computer-readable storage media of claim 7, wherein establishing a time-depth relationship in the target subsurface area comprises:
  receiving one or more well logs measured in one or more drilled wells in proximity of the target subsurface area; and
  establishing, based on the one or more well logs, the time-depth relationship in the target subsurface area.

9. The one or more non-transitory computer-readable storage media of claim 8, wherein the one or more well logs comprise at least one of: a sonic log, a vertical seismic profile, or a check-shots log.

10. The one or more non-transitory computer-readable storage media of claim 7, wherein using the iso-frequency ratio log to identify a subsurface gas reservoir in the target subsurface area comprises:
  identifying a high amplitude frequency ratio in the iso-frequency ratio log; and
  designating an area associated with the high amplitude frequency ratio as the subsurface gas reservoir.

11. The one or more non-transitory computer-readable storage media of claim 10, wherein designating an area associated with the high amplitude frequency ratio as the subsurface gas reservoir comprises:
  determining whether the high amplitude frequency ratio is greater than a threshold frequency ratio; and
  in response to determining that the high amplitude frequency ratio is greater than the threshold frequency ratio, determining that the high amplitude frequency ratio is indicative of a gas bearing region.

12. A system comprising:
one or more processors configured to perform operations comprising:
  spectrally decomposing seismic data associated with a target subsurface area into a plurality of iso-frequency volumes, wherein the seismic data is a Relative Amplitude Preserved (RAP) processed three-dimensional (3D) Pre-Stack Time Migration (PSTM) seismic data volume;
  selecting a low-frequency volume and a high-frequency volume from the plurality of iso-frequency volumes;
  dividing the low-frequency volume by the high-frequency volume to generate a frequency ratio volume for the target subsurface area, wherein dividing the low-frequency volume by the high-frequency volume comprises dividing values of low-frequency seismic data in the low-frequency volume by values of high-frequency seismic data in the in the high-frequency volume;
  establishing a time-depth relationship in the target subsurface area;
  extracting, based on the time-depth relationship and the frequency ratio volume, an iso-frequency ratio log in the target subsurface area, wherein extracting the iso-frequency ratio log comprises:
    using the time-depth relationship to associate depth information of the target subsurface area with the frequency ratio volume; and
    extracting, from the frequency ratio volume, the iso-frequency ratio log along the target subsurface area; and
  using the iso-frequency ratio log to identify a subsurface gas reservoir in the target subsurface area.

13. The system of claim 12, wherein establishing a time-depth relationship in the target subsurface area comprises:
  receiving one or more well logs measured in one or more drilled wells in proximity of the target subsurface area; and
  establishing, based on the one or more well logs, the time-depth relationship in the target subsurface area.

14. The system of claim 13, wherein the one or more well logs comprise at least one of: a sonic log, a vertical seismic profile, or a check-shots log.

* * * * *

UNITED STATES PATENT AND TRADEMARK OFFICE
CERTIFICATE OF CORRECTION

| | | |
|---|---|---|
| PATENT NO. | : 12,153,180 B2 | Page 1 of 1 |
| APPLICATION NO. | : 17/655925 | |
| DATED | : November 26, 2024 | |
| INVENTOR(S) | : Taher M. Sodagar and Amin Z. Alali | |

It is certified that error appears in the above-identified patent and that said Letters Patent is hereby corrected as shown below:

In the Claims

In Column 16, Line 63, Claim 7, please replace "in the in the" with -- in the --.

In Column 18, Line 16, Claim 12, please replace "in the in the" with -- in the --.

Signed and Sealed this
Seventeenth Day of June, 2025

Coke Morgan Stewart
*Acting Director of the United States Patent and Trademark Office*